United States Patent [19]

Ikemoto et al.

[11] Patent Number: 4,625,844

[45] Date of Patent: Dec. 2, 1986

[54] GEAR SYNCHRONIZER ASSEMBLY FOR POWER TRANSMISSION

[75] Inventors: Kazuhito Ikemoto; Yukio Terakura, both of Toyota, Japan

[73] Assignee: Toyota Jidosha Kabushiki Kaisha, Aichi, Japan

[21] Appl. No.: 677,748

[22] Filed: Dec. 3, 1984

[30] Foreign Application Priority Data

Dec. 5, 1983 [JP] Japan .................. 58-229587

[51] Int. Cl.$^4$ ........... F16D 23/06; F16D 21/04
[52] U.S. Cl. ............... 192/53 F; 192/48.91; 74/339
[58] Field of Search ........... 192/53 E, 53 A, 53 F, 192/48.91; 74/339

[56] References Cited

U.S. PATENT DOCUMENTS

| 2,364,331 | 12/1944 | White | 192/53 F |
|---|---|---|---|
| 3,700,083 | 10/1972 | Ashikawa et al. | 192/53 F |

FOREIGN PATENT DOCUMENTS

| 933364 | 9/1955 | Fed. Rep. of Germany . | |
|---|---|---|---|
| 2331053 | 1/1975 | Fed. Rep. of Germany | 192/53 F |
| 554047 | 1/1957 | Italy | 192/53 F |
| 554048 | 1/1957 | Italy | 192/53 F |
| 100428 | 7/1980 | Japan | 192/53 F |
| 58-137627 | 8/1983 | Japan . | |
| 58-163829 | 9/1983 | Japan . | |
| 58-174724 | 10/1983 | Japan . | |
| 1314851 | 4/1973 | United Kingdom . | |
| 1502346 | 3/1978 | United Kingdom . | |

Primary Examiner—Rodney H. Bonck
Assistant Examiner—David A. Testardi
Attorney, Agent, or Firm—Parkhurst & Oliff

[57] ABSTRACT

In a gear synchronizer assembly of the well-known type, a clutch sleeve is formed at its inner periphery with an internal radial projection, and a thrust mechanism comprises a radially contractible annular resilient member supported in place by engagement with the inner circumference of an outer cylindrical hub portion of a hub member fixed to a transmission shaft. The resilient member has an axial leg extending therefrom toward the internal radial projection of the clutch sleeve and having a radial projection which is arranged to be engaged with the internal radial projection in shifting operation of the clutch sleeve toward a spline piece integral with a change-speed gear and arranged to abut against and urge a synchronizer ring toward the spline piece upon engagement with the internal radial projection.

4 Claims, 4 Drawing Figures

GEAR SYNCHRONIZER ASSEMBLY FOR POWER TRANSMISSION

BACKGROUND OF THE INVENTION

The present invention relates to a gear synchronizer assembly for power transmissions, and more particularly, but not exclusively, to a gear synchronizer mechanism of the type which comprises a gear member rotatable on a transmission shaft, a spline piece formed at one side thereof with a conical portion and thereon with external splines and mounted on a hub portion of the gear member for rotation therewith, a synchronizer ring mounted on the spline piece conical portion and cooperatable with the same for frictional engagement therewith in its shifted position, a hub member formed thereon with external splines and fixed to the shaft for rotation therewith, a clutch sleeve encircling the hub member and having internal splines in continual engagement with the external splines of the hub member, the clutch sleeve being axially shiftable to be engaged at the internal splines thereof with the external splines of the spline piece, and a thrust mechanism for moving the synchronizer ring toward the spline piece in shifting operation of the clutch sleeve to effect the frictional engagement between the synchronizer ring and the spline piece.

In such a conventional gear synchronizer mechanism as described above, the thrust mechanism comprises a plurality of circumferentially spaced strut keys each having a raised portion in engagement with a corresponding recess in the inner peripheral wall of the clutch sleeve, and a circular retainer spring arranged to bias the strut keys radially outwardly for engagement with the clutch sleeve. To simplify the construction and manufacturing process of the thrust mechanism, an improved thrust mechanism has been proposed in Japanese Early Patent Publications Nos. 55-100428, 58-137627, 58-163829, and 58-174724, wherein the strut keys and retainer springs are replaced with a single thrust element. It is, however, difficult to enhance productivity of the gear synchronizer mechanism because the single thrust element is complicated in its configuration and construction.

SUMMARY OF THE INVENTION

It is, therefore, a primary object of the present invention to provide an improved gear synchronizer mechanism, wherein the thrust mechanism can be manufactured in a simple manner to enhance productivity of the gear synchronizer mechanism and to lower the production cost of the same.

According to the present invention there is provided a gear synchronizer assembly, wherein the clutch sleeve is formed at its inner periphery with an internal radial projection, and wherein the thrust mechanism comprises a radially contractible annular resilient member supported in place by engagement with the inner circumference of an outer cylindrical hub portion of the hub member, the resilient member having an axial leg extending therefrom toward the internal radial projection of the clutch sleeve and having a radial projection arranged to be brought into engagement with the internal radial projection of the clutch sleeve in shifting operation of the clutch sleeve toward the spline piece and arranged to abut against and urge the synchronizer ring toward the spline piece upon engagement with the internal radial projection of the clutch sleeve, the axial leg of the resilient member being arranged to be compressed radially inwardly by engagement with the internal radial projection of the clutch sleeve.

BRIEF DESCRIPTION OF THE DRAWINGS

Additional objects, features and advantages of the present invention will become more readily apparent from the following detailed description of certain preferred embodiments thereof when considered with reference to the attached drawings, in which.

DETAILED DESCRIPTION OF THE PREFERRED EMBODIMENTS

Figure 1:
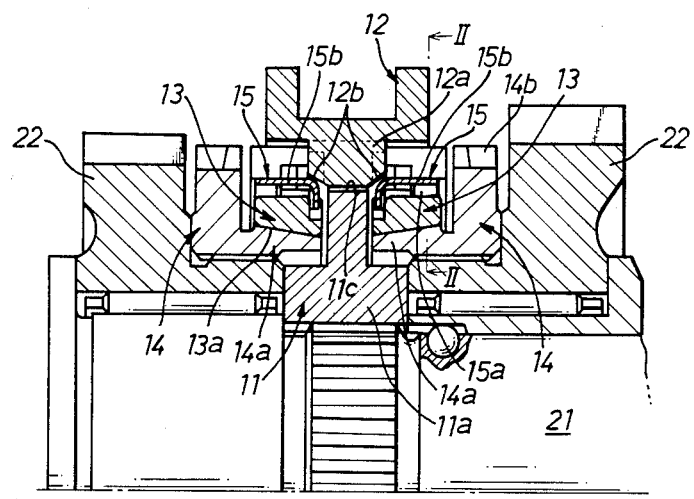
FIG. 1 illustrates in cross-sectional form one of the circumferentially equi-spaced parts of a gear synchronizer assembly according to the present invention.
Figure 3:
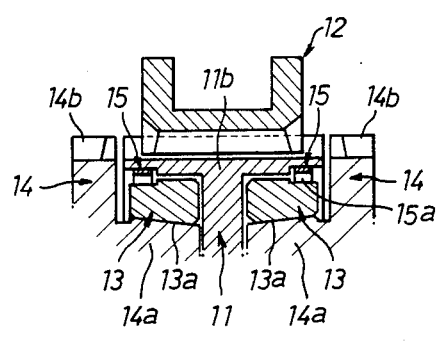
FIG. 3 is a cross-sectional view taken along line III—III in FIG. 2.
Figure 4:
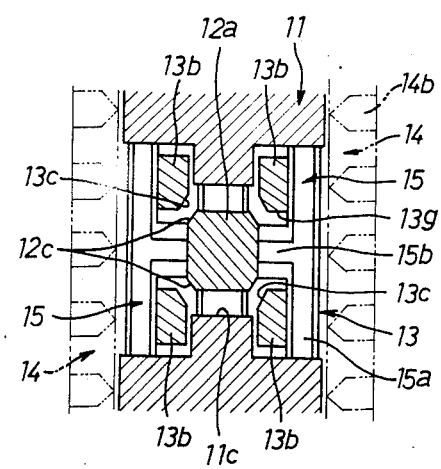
FIG. 4 is a partial view taken along line IV—IV in FIG. 2, showing the relative positions of the clutch sleeve, the synchronizer ring and the spline piece illustrated in FIGS. 1 to 3.
Figure 2:
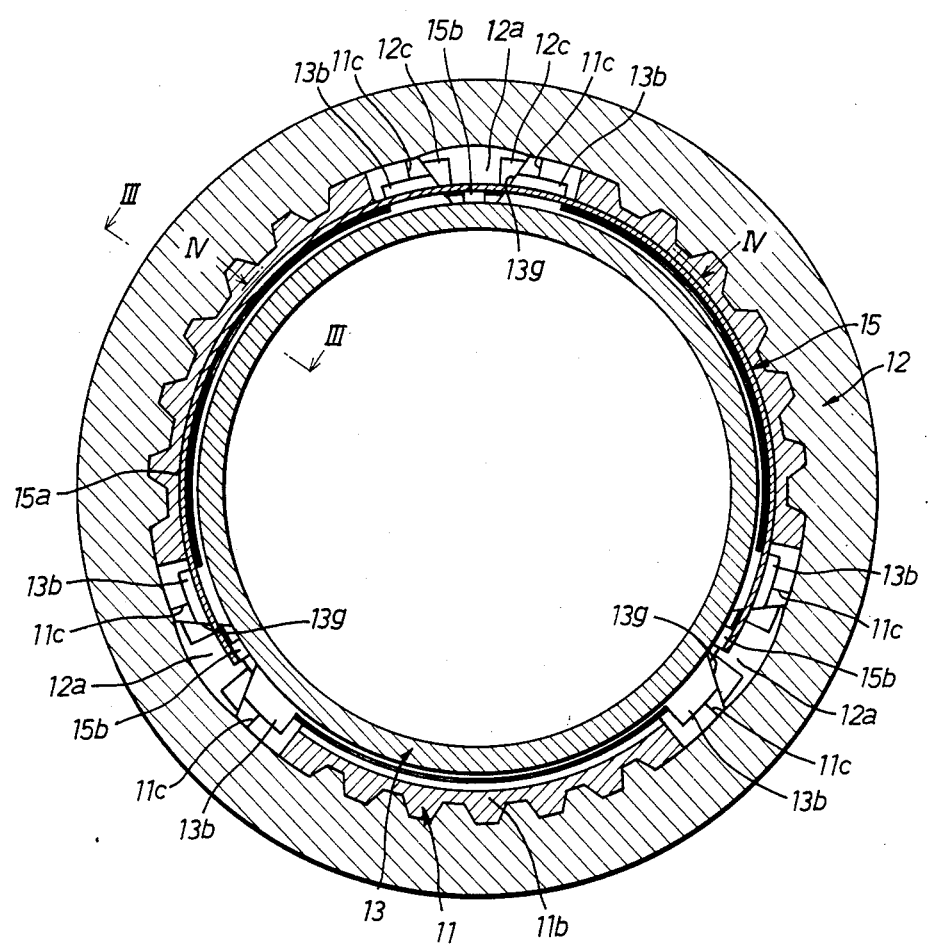
FIG. 2 is a cross-sectional view taken along line II—II in FIG. 1.

Referring now to the drawings, wherein like reference numerals represent the same or corresponding parts throughout the figures, there is illustrated, in FIG. 1, a transmission shaft 21, on which are rotatably supported a pair of change-speed gears 22 and 22. Disposed between the change-speed gears 22 and 22 is a pair of synchronizer assemblies which are operable to cause selective speed synchronization between the shaft 21 and the gears 22 and 22, respectively. As is illustrated in FIGS. 1 and 2, the synchronizer assemblies have a common hub assembly which includes a hub member 11, and a pair of radially contractible annular resilient members 15, 15. The synchronizer assemblies are arranged to be operated through a clutch sleeve 12 which is connected by a yoke groove to a conventional mechanical shift mechanism (not shown). The hub member 11 is fixed at its inner hub portion 11a to the transmission shaft 21 by means of a spline connection to rotate therewith. The hub member 11 is integrally formed with an outer cylindrical hub portion 11b which is formed thereon with external splines. The clutch sleeve 12 is in surrounding relationship with the outer cylindrical hub portion 11b of hub member 11 and has internal splines in continual engagement with the external splines of hub member 11. The clutch sleeve 12 is axially shiftable to be engaged at the internal splines thereof with external splines 14b of a spline piece 14.

The left-hand synchronizer assembly is substantially the same as the right-hand synchronizer assembly such that a detailed description of the right-hand synchronizer assembly only is believed necessary. The right-hand synchronizer assembly includes the spline piece 14 and a synchronizer ring 13. The spline piece 14 is fixedly mounted on a hub portion of change-speed gear 22 by means of a spline connection to rotate therewith. The spline piece 14 is formed at its left end with a conical portion 14a and thereon with the external splines 14b which are provided with a chamfer at each end. The synchronizer ring 13 is rotatably and axially slidably mounted on the conical portion 14a of spline piece 14 and has an internal conical surface 13a for frictional engagement with the surface of the spline piece conical portion 14a. Thus, the synchronizer ring 13 cooperates with the spline piece conical portion 14a to provide a friction clutch in a well-known manner.

In this embodiment, the outer cylindrical hub portion 11b of hub member 11 is axially recessed in its circumferentially equi-spaced three portions. As can be well seen in FIG. 2, the axially recessed portions each are formed as an axial groove 11c. The clutch sleeve 12 is formed at its inner periphery with circumferentially equi-spaced three internal radial projections 12a which are axially movable in the axial grooves 11c of hub member 11, respectively. The internal radial projections 12a of clutch sleeve 12 each are formed at their inner end corners with tapered surfaces 12b and at their side corners with chamfers 12c. The synchronizer ring 13 is formed in its outer periphery with circumferentially equi-spaced three axial grooves 13g which are arranged to permit therethrough axial movement of the internal radial projections 12a, respectively. A pair of raised portions 13b forming the axial groove 13g are respectively formed at their inside corners with a chamfer 13c engageable with the corresponding chamfer 12c of the internal radial projection 12a.

As is illustrated in FIGS. 1 and 2, the radially contractible annular resilient member 15 includes a C-letter shaped ring portion 15a which is formed at opposite ends thereof with a pair of axial legs 15b and at an intermediate portion thereof with an axial leg 15b. The ring portion 15a of resilient member 15 is formed larger in diameter than the inner circumference of outer cylindrical hub portion 11b of hub member 11 and supported in place by engagement with the inner circumference of hub portion 11b in the presence of a radial force imposed thereto. The axial legs 15b of resilient member 15 each extend from the ring portion 15a toward the internal radial projection 12a of clutch sleeve 12 through the axial groove 13g in synchronizer ring 13. The axial legs 15b of member 15 each are formed with a radial projection which is arranged between the inner end surface of synchronizer ring 13 and the tapered surface 12b of the internal radial projection 12a of clutch sleeve 12. (see FIG. 1).

When it is desired to engage the change-speed gear 22 to the transmission shaft 21, the clutch sleeve 12 is shifted toward the spline piece 14. Then, the axial legs 15b of resilient member 15 are slightly moved by engagement with the tapered surfaces 12b of internal radial projections 12 at their inner shoulders such that each radial projection of axial legs 15b abuts against and urges the synchronizer ring 13 toward the spline piece 14 which will first effect frictional engagement of the internal conical surface 13a of synchronizer ring 13 and the surface of the spline piece conical portion 14a. Simultaneously, the axial movement of clutch sleeve 12 will be resisted by the balk action between the chamfers 12c of internal radial projections 12a and the chamfers 13c of synchronizer ring 13. When the thrust pressure acting on resilient member 15 exceeds a predetermined value, synchronism between the relatively rotating parts is established, and the internal radial projections 12a of clutch sleeve 12 ride over the axial legs 15b of resilient member 15 thereby compressing them radially inwardly. This permits the internal radial projections 12a of clutch sleeve 12 to pass through the axial grooves 13g of synchronizer ring 13 toward the spline piece 14. Thus, the internal splines of clutch sleeve 12 will be brought into engagement with the external splines 14b of spline piece 14 to accomplish the synchronization. Under such a condition, the ring portion 15a of resilient member 15 is compressed radially inwardly by engagement with the internal radial projections 12a to retain the clutch sleeve 12 in its shifted position.

In the gear synchronizer assembly described above, it is advantageous that the radially contractible annular resilient member 15 can be formed in a simple construction particularly in combination with the arrangement of the internal radial projections 12a of clutch sleeve 12 which are axially movably disposed in the axial grooves 11c of the outer cylindrical hub portion 11b. It is, therefore, able to reduce the component parts so as to enhance productivity of the gear synchronizer assembly at a low cost.

Having now fully set forth both structure and operation of certain preferred embodiments of the concept underlying the present invention, various other embodiments as well as certain variations and modifications of the embodiments herein shown and described will obviously occur to those skilled in the art upon becoming familiar with the underlying concept. It is to be understood, therefore, that with the scope of the appended claims, the invention may be practiced otherwise than as specifically set forth herein.

What is claimed is:

1. In a gear synchronizer assembly comprising a gear member rotatable on a transmission shaft, a spline piece formed at one side thereof with a conical portion and thereon with external splines and mounted on a hub portion of said gear member for rotation therewith, a synchronizer ring mounted on the conical portion of said spline piece for frictional engagement therewith, a hub member fixedly mounted on said shaft for rotation therewith and having a cylindrical hub portion encircling said synchronizer ring and formed thereon with external splines, a clutch sleeve encircling the cylindrical hub portion of said hub member and having internal splines in continual engagement with the external splines of said hub member, said clutch sleeve being axially shiftable toward and away from said gear member to be engaged at the internal splines thereof with the external splines of said spline piece, and thrust means for moving said synchronizer ring toward said spline piece in shifting operation of said clutch sleeve toward said gear member to effect the frictional engagement of said synchronizer ring with said spline piece, the improvement wherein said clutch sleeve is formed at its inner periphery with an internal radial projection axially movable in a corresponding axial groove formed in the cylindrical hub portion of said hub member, and wherein said thrust means comprises a radially contractibe annular resilient member arranged in surrounding relationship with said synchronizer ring and axially slidably supported in place by engagement with the inner circumference of the cylindrical hub portion of said hub member, said resilient member having an axial leg extending therefrom toward the internal radial projection of said clutch sleeve and having a radial projection arranged between said hub member and said synchronizer ring to be brought into engagement with the internal radial projection of said clutch sleeve in shifting operation of said clutch sleeve toward said gear member and being arranged to abut against and urge said synchronizer ring toward said spline piece upon engagement with the internal radial projection of said clutch sleeve, the axial leg of said resilient member being further arranged to be compressed radially inwardly by engagement with the internal projection of said clutch sleeve.

2. A gear synchronizer assembly according to claim 1, wherein the internal radial projection of said clutch sleeve is formed at its inner end with a tapered surface engageable with an inner shoulder of the axial leg of said annular resilient member.

3. A gear synchronizer assembly according to claim 1, wherein said synchronizer ring is integrally formed thereon with a pair of raised portions which are provided with a chamfer at each thereof, and wherein the internal radial projection of said clutch sleeve is arranged to pass through an axial groove between the raised portions of said synchronizer ring, the internal radial projection of said clutch sleeve being formed at one side thereof with a pair of chamfers to be engaged with the chamfers of said raised portions on said synchronizer ring.

4. A gear synchronizer assembly according to claim 1, wherein said clutch sleeve is formed at its inner periphery with circumferentially equi-spaced three internal radial projections axially movable in the corresponding axial grooves formed in the cylindrical hub portion of said hub member, and wherein said radially contractible annular resilient member is a C-letter shaped resilient member which is formed at opposite ends thereof with a pair of circumferentially spaced axial legs and at an intermediate portion thereof with an axial leg, said axial legs each extending from said resilient member toward the respective internal radial projections of said clutch sleeve and having a radial projection arranged to be brought into engagement with the internal radial projections of said clutch sleeve, respectively.

* * * * *